US012792455B2

(12) United States Patent
Pourmohseni et al.

(10) Patent No.: US 12,792,455 B2
(45) Date of Patent: Nov. 10, 2026

(54) ORCHESTRATION DEVICE FOR A DISTRIBUTED PROCESSING SYSTEM

(71) Applicant: Robert Bosch GmbH, Stuttgart (DE)

(72) Inventors: Behnaz Pourmohseni, Munich (DE); Anthony Rowe, Pittsburgh, PA (US); Arne Hamann, Ludwigsburg (DE); Dakshina Narahari Dasari, Renningen (DE); Fedor Smirnov, Erlangen (DE); Michael Pressler, Karlsruhe (DE); Nuno Pereira, Pittsburgh, PA (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 19/070,884

(22) Filed: Mar. 5, 2025

(65) Prior Publication Data

US 2025/0298689 A1 Sep. 25, 2025

(30) Foreign Application Priority Data

Mar. 21, 2024 (EP) .................................... 24165069

(51) Int. Cl.

| | |
|---|---|
| ***G06F 11/00*** | (2006.01) |
| ***G06F 9/48*** | (2006.01) |
| ***G06F 9/50*** | (2006.01) |
| ***G06F 11/07*** | (2006.01) |

(52) U.S. Cl.

CPC .......... *G06F 11/0793* (2013.01); *G06F 9/485* (2013.01); *G06F 9/5033* (2013.01); *G06F 11/0709* (2013.01); *G06F 11/0721* (2013.01)

(58) Field of Classification Search

CPC .... G06F 9/485; G06F 9/5033; G06F 11/0709; G06F 11/0721; G06F 11/0793

See application file for complete search history.

(56) References Cited

U.S. PATENT DOCUMENTS

| | | | | |
|---|---|---|---|---|
| 8,250,131 | B1 * | 8/2012 | Pulsipher .............. | G06F 9/4843 709/201 |
| 9,037,922 | B1 * | 5/2015 | Cabrera ................ | G06F 11/076 714/47.1 |
| 9,374,417 | B1 * | 6/2016 | Greenfield .......... | G06F 11/0712 |
| 9,430,280 | B1 * | 8/2016 | Shih ...................... | G06F 9/5005 |

(Continued)

OTHER PUBLICATIONS

Lee, et al.: "BumbleBee: Application-aware adaptation for container orchestration," arXiv:2008.11868v3, (2021), XP081950433, pp. 1-15.

*Primary Examiner* — Joshua P Lottich

(74) *Attorney, Agent, or Firm* — NORTON ROSE FULBRIGHT US LLP

(57) ABSTRACT

An orchestration device for a distributed processing system. The orchestration device includes an input interface configured to receive a specification of a data processing task to be performed by the distributed processing system and of one or more failure types that the data processing system should be able to handle when performing the data processing task, and a command interface configured to instruct each of a plurality of processing nodes of the distributed processing system to perform at least one respective sub-task of the data processing task and instruct each of at least some of the plurality of processing nodes to implement one or more failure handling software modules which are configured to handle failures of the specified failure types.

9 Claims, 4 Drawing Sheets

(56) References Cited

U.S. PATENT DOCUMENTS

| | | | | |
|---|---|---|---|---|
| 2015/0134695 | A1* | 5/2015 | Zhao | G06F 16/25 707/769 |
| 2017/0285982 | A1* | 10/2017 | DeArment | G06F 11/07 |
| 2019/0370023 | A1* | 12/2019 | Israni | G06F 3/065 |
| 2023/0251896 | A1* | 8/2023 | Venkateshaiah | G06F 9/4881 718/102 |
| 2024/0160521 | A1* | 5/2024 | Angelsmark | G06F 11/0793 |

* cited by examiner

ORCHESTRATION DEVICE FOR A DISTRIBUTED PROCESSING SYSTEM

CROSS REFERENCE

The present application claims the benefit under 35 U.S.C. § 119 of German Patent Application No. EP 24 16 5069.6 filed on Mar. 21, 2024, which is expressly incorporated herein by reference in its entirety.

FIELD

The present invention relates to orchestration devices, techniques and approaches for distributed processing systems.

BACKGROUND INFORMATION

Applications in real-time/safety-critical systems are often bound to strict timing constraints and must adhere to rigorous reliability and safety requirements. Cyber-physical systems (CPSs), e.g., from automotive industry and industrial control/automation, are examples in which applications are not only required to operate within stringent end-to-end latency bounds (for example, for the control loop comprising sensing, processing, and actuation tasks) but also need to be resilient against faults and failures, relying on mechanisms to detect faults and failures (integrity), and upon detection of them, either enable uninterrupted correct operation of the affected applications (fault tolerance) or switch them to a safe mode (safety).

A real-time/safety-critical system typically encompasses a multitude of applications, each with distinct requirements. In a dynamic distributed system, applications are dynamically added/removed to/from the system, and deployed applications are distributed over a set of possibly heterogeneous compute nodes interconnected via a communication network. Distribution and deployment of applications in such systems is an intricate and complex task. Fulfilling the individual requirements of each application in accordance with the availability of resources in the system demands careful analysis and software/hardware considerations accounting for real-time, reliability, safety, and domain-specific (e.g., control engineering) aspects.

State-of-the-art approaches for dynamic distribution and deployment of applications in distributed systems use a central component, responsible for managing applications and resources of the system in view of possible system dynamics. This component, typically referred to as the orchestrator, undertakes tasks such as deploying incoming applications, monitoring the state of deployed applications and resources in the system, and reacting to system dynamics, e.g., resource failures or workload changes, by adapting the deployment of applications accordingly. Existing orchestration frameworks, e.g., Kubernetes, AWS Elastic Container Service (ECS), and AWS Step Functions, are designed for best-effort applications and systems, primarily cloud-based systems, which are not subject to stringent timing requirements. They lack the necessary mechanisms for enforcing the requirements of applications in real-time safety-critical domains and cannot provide the necessary Quality-of-Service (QoS) guarantees needed for these systems.

Accordingly, task distribution approaches are desirable which are capable of establishing the required QoS guarantees of such systems pertaining to aspects such as real-time requirements, reliability, fault tolerance and safety for real-time/safety-critical systems.

SUMMARY

According to various example embodiments of the present invention, an orchestration device for a distributed processing system is provided comprising

- an input interface configured to receive a specification of a data processing task to be performed by the distributed processing system and of one or more failure types that the data processing system should be able to handle when performing the data processing task and
- a command interface configured to instruct each of a plurality of processing nodes of the distributed processing system (which may be a sub-set of all the processing nodes of the distributed processing system, i.e. the plurality of the processing nodes may be some of the processing nodes of the distributed system) to perform at least one respective sub-task of the data processing task and instruct each of at least some of the plurality of processing nodes to implement one or more failure handling software modules which are configured to handle failures of the specified failure types.

The orchestration device allows deploying (additional) capabilities for real-time applications to react to system dynamics in real time, autonomously, and without the involvement of the orchestrator. It may be used for distributed processing systems with real-time and/or safety-critical applications, e.g., CPSs related to industrial control and automation, automotive control and automated-/autonomous driving, and other real-time systems targeting distributed infrastructure, e.g., in the context of industry 4.0, Industrial IoT (IIoT), or automotive zone architecture.

In the following, various examples of embodiments of the present invention are given.

Example 1 is an orchestration device as described above.

Example 2 is the orchestration device of example 1, wherein the one or more failure handling software modules are configured to handle failures of the specified failure types without necessitating communication with the orchestration device.

In other words, once deployed on the processing nodes, the failure handling software modules can handle failures of the failure types independently from the orchestration device. This allows using a central orchestration device remote to the processing nodes and nevertheless handling failures in real-time.

Example 3 is the orchestration device of example 1 or 2, wherein the input interface is configured to receive a specification of a plurality of software modules, wherein each software module implements a respective one of the sub-tasks and wherein the orchestration device comprises a software generator configured to supplement the plurality of software modules by the one or more failure handling software modules.

In other words, the orchestration device adds the capability to handle the one or more failure types to given software. Thus, a user does not need to take care of providing code to handle the failure types but the failure handling is transparent for the user and transparent for the data processing task.

Example 4 is the orchestration device of any one of examples 1 to 3, wherein the input interface is configured to receive a specification on how the data processing task may be separated into the sub-tasks and/or a specification of requirements of how the data processing task is to be performed and the orchestration device is configured to distribute the data processing task to the plurality of processing nodes according to the specification on how the data processing task may be separated into the sub-tasks and/or the requirements.

For example, the orchestration device may take into account that the data processing task should be carried out in a manner that real-time requirements are fulfilled.

Example 5 is the orchestration device of any one of examples 1 to 4, wherein the data processing task is a (e.g. real-time) control task of a technical system.

For example, one of the plurality of processing nodes is a controller connected to the technical system (and e.g. arranged near or installed in the technical system) and at least one of the plurality of processing nodes is arranged remotely (e.g. is an edge node or arranged in a cloud) taking over data processing for the control of the technical system.

Example 6 is the orchestration device of any one of examples 1 to 5, wherein the command interface is configured to instruct, upon a failure (which may or may not be of the failure types) which compromises the distributed processing system's capability to handle failures of the specified failure types, one or more of the plurality of processing nodes and/or one or more additional processing nodes of the distributed processing system to implement the one or more failure handling software modules and/or one or more additional failure handling modules which are configured to handle failures of the specified failure types (to restore the processing system's capability to handle the one or more specified failure types).

In other words, the orchestration device may dynamically control the failure handling capabilities of the distributed processing system, in particular reconfigure the distributed processing system in case it has lost the capability to handle failures of a certain failure type (e.g. because one processing node has been disconnected).

Example 7 is a method for orchestrating a distributed processing system, comprising receiving a specification of a data processing task to be performed by the distributed processing system and of one or more failure types that the data processing system should be able to handle when performing the data processing task and instructing each of a plurality of processing nodes of the distributed processing system (e.g. a sub-set of all the processing nodes of the distributed system) to perform at least one respective sub-task of the data processing task and instruct each of at least some of the plurality of processing nodes to implement one or more failure handling software modules which are configured to handle failures of the specified failure types.

Example 8 is a computer program comprising instructions which, when executed by a computer, makes the computer perform a method according to example 7.

Example 9 is a computer-readable medium comprising instructions which, when executed by a computer, makes the computer perform a method according to example 7.

It should be noted that examples may be combined and features described in context of the orchestration device are analogously applicable for the method.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
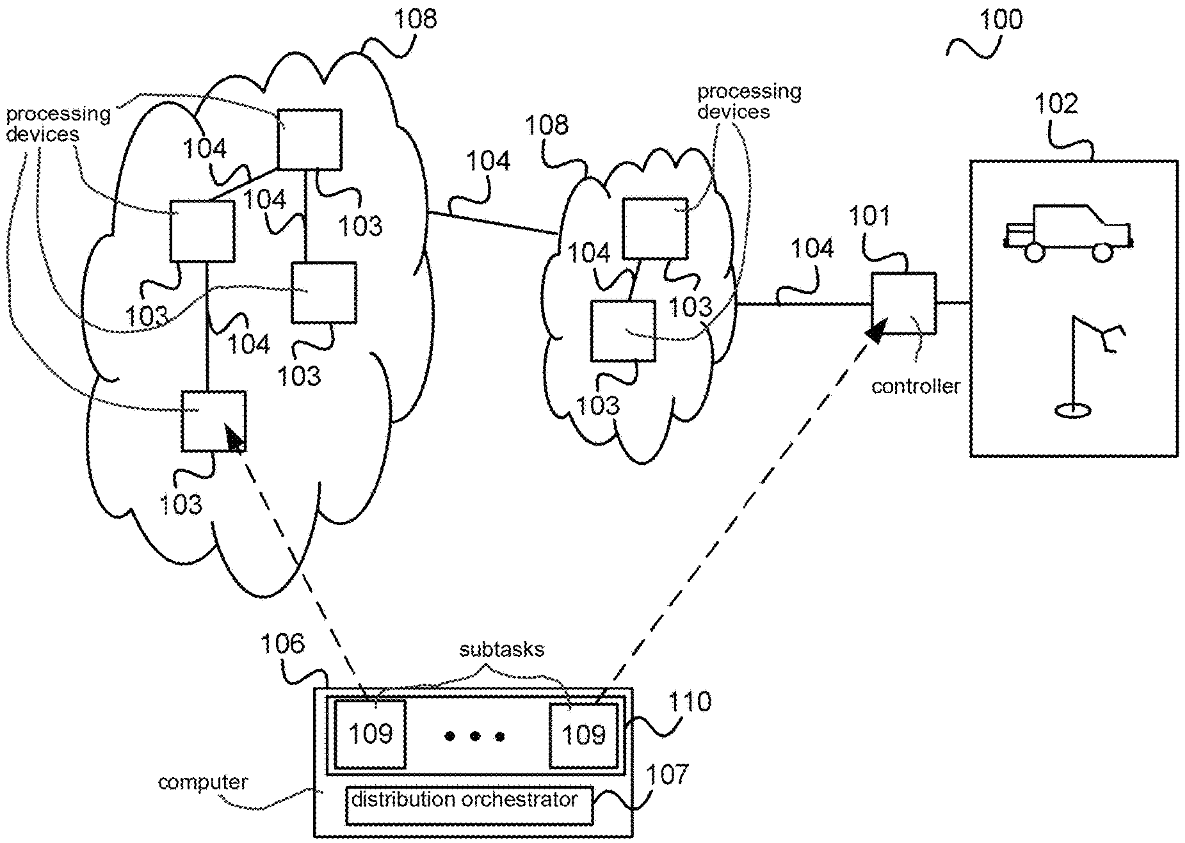
FIG. 1 shows a data processing arrangement, according to an example embodiment of the present invention.

FIG. 1 shows data processing arrangement 100.

The data processing arrangement 100 includes a controller 101 which is arranged to control a controlled system 102 such as a robot, a vehicle, a machine, etc.

The data processing arrangement 100 further comprises (additional) processing devices 103 which are connected to the controller 101 (and possibly also to each other) by communication connections 104 which may be realized by various interconnection technologies, such as wireless and/or wired communication networks 108 busses, etc. For example, at least some of the processing devices 103 are arranged in an edge cloud. The data processing arrangement 100 for example implements a cyber-physical system (CPS).

Each processing device 103 may implement one or more processing nodes. For example, a processing device 103 may correspond to a single processing node but a processing device 103 may also include a sufficient amount of resources (e.g. a server computer) such that it implements multiple processing nodes.

According to various embodiments, control software for controlling the controlled system 102 (and designed to run on the controller 101) is executed in a distributed manner, i.e. is distributed over multiple processing nodes, e.g. the controller 101 and one or more processing devices 103. The distribution is for example performed by a computer 106.

For this, according to various embodiment, an automated distribution tool (or "distribution orchestrator") 107 (and corresponding distribution approach) is provided (e.g. implemented on the computer 106 which may accordingly be seen as a orchestration device) that distributes a data processing task (e.g. control task) 110 of the control software into sub-tasks 109 which can then be executed by processing nodes, e.g. multiple processing devices (e.g. the controller 101 itself and at least some of the (additional) processing devices 103, e.g. edge devices).

Dynamic distributed deployment and management of real-time/safety-critical applications (i.e. applications for which real-time and/or safety-critical data processing tasks 109 need to be performed) requires orchestration solutions capable of establishing the required QoS (Quality-of-Service) guarantees of a (distributed) system performing data processing tasks 110 for these applications (e.g. data processing arrangement 100) pertaining to aspects such as real-time requirements, reliability, fault tolerance, safety, etc.

A straightforward approach towards establishing a suitable orchestration solution for such systems involves equipping an orchestrator 107 with supplementary analyses and resource-management/configuration capabilities to empower it to (i) deploy applications with suitable configurations to establish real-time guarantees in line with their timing requirements and (ii) continuously monitor system dynamics with respect to the particular aspects crucial for the correct operation of deployed applications to detect critical events or scenarios and react to them accordingly (e.g., by adapting the deployment of affected applications) to maintain or resume correct operation of applications in adherence with their real-time requirements.

This straightforward approach can potentially establish correct operation of applications in line with their real-time requirements when deploying applications and after their deployment has been adapted in reaction to critical runtime events such as resource failure. However, when reacting to critical events, having the orchestrator 107 involved in the reaction loop makes the correct operation of the affected applications strictly reliant on the orchestrator's ability to react to the events within the timing constraints of the affected applications. This reliance raises an issue: For reacting to system dynamics, the orchestrator 107 uses a toolset of (potentially) computationally intensive mapping, analysis, and optimization procedures, lacking the timing predictability and responsiveness needed to provide a timely reaction in line with the real-time requirements of applications. On the flip side, for the applications affected by critical events, a real-time reaction within their timing constraints is required to ensure their correct operation is preserved or re-established properly.

In fact, any process (and thus any data processing task) vital for correct operation of a real-time/safety-critical application is inherently required to adhere to the same real-time constraints as the application itself. Therefore, having the orchestrator 107 involved in the reaction loop for critical runtime events entails the risk of violating the real-time requirements of applications in the face of system dynamics and events that can endanger their correct operation.

Moreover, considering the typically limited compute power of resources in CPSs on the one hand and the high compute-power demands of the orchestrator 107 on the other hand, it is often desirable that the orchestrator 107 is deployed on a processing node (computer 106) with high compute power, potentially remote from the system it controls (e.g. remote from the processing devices 103 and the controller 101). This spatial distance and the associated added communication "hops" lead to higher communication delay between the orchestrator 107 and the rest of the system which can be significant, given the typically limited communication bandwidth in CPS systems. Thus, the resulting communication latency can significantly inflate the end-to-end reaction time to critical events. It is, therefore, imperative for time-critical decisions and reactions to take place as close to the affected parts of the system as possible.

Finally, having the orchestrator 107 involved in the reaction loop of all critical events renders it as the single point of failure for the whole system which is highly undesired particularly in a safety-critical context.

According to various embodiments, an approach (and corresponding distribution tool 107) for distributing a data processing task is provided which, in view of the above, establishes real-time reaction mechanisms in the close vicinity of the respective applications which resolves the issue of a single point of failure formed by the orchestrator 107 by eliminating the orchestrator 107 from the reaction loop of critical runtime events.

So, according to various embodiments, a task distribution method including dynamic provisioning of real-time reaction mechanisms in a distributed processing system is provided. It enables handling critical system dynamics in a real-time fashion, within the timing constraints of the affected application(s), and without the involvement of the orchestrator in the reaction process. The method establishes a decoupled design paradigm in which the post-deployment operationality of applications is decoupled from the orchestrator.

A main aspect of the distribution method may be seen in that it involves provisioning real-time applications a priori with additional services and mechanisms capable of detecting critical runtime events and reacting to them accordingly. The choice of reaction mechanisms depends on the concrete event and the requirements of the application, e.g., in terms of reliability, safety, and fault tolerance. The reaction might involve adapting the deployment of the application, changing the configuration of its components or the resources they use, or switching its operational mode, e.g., to a fail-safe mode in the case of a non-recoverable failure. These additional services and mechanisms are deployed together with the application or added to it dynamically, and once established, they are guaranteed to provide their respective reactions within the real-time constraints of the application.

The distribution method is for example carried out by the computer 106, e.g. by the automated distribution tool 107. Thus, according to various embodiments, an orchestration device (e.g. server computer) is provided which is configured to perform the distribution method and comprises components which are configured accordingly (in particular interfaces etc.)

The distribution method allows distributing a data processing task to multiple processing nodes in a way which provides

- The capability for real-time reaction to critical runtime events: real-time applications are equipped with (e.g. provisional) services and mechanisms which allow for real-time reactions to critical runtime events, lifting the dependence of applications on the non-real-time orchestrator after deployment.
- Robustness against unavailability of the orchestrator: the distribution method achieves independence of the applications (and the data processing tasks performed for them) from the orchestrator after deployment. This signifies that the processing system (i.e. the system of processing nodes performing the data processing) can operate autonomously irrespective of the orchestrator's responsiveness or even its presence. This makes the processing system resilient against (temporary) unavailability of the orchestrator.
- Potential for remote orchestrator deployment: the independence of the processing system from the orchestrator's real-time responsiveness creates the opportunity to deploy the orchestrator on a powerful server, potentially located remotely, e.g., in the cloud, to better accommodate its high computational demands or to enable the usage of orchestrators with high computational demands.
- Dynamic provisioning of real-time reaction mechanisms: although the distribution method lifts the dependence of deployed real-time applications on the orchestrator, the possibility still exists for the orchestrator to monitor the system dynamics. In response, it can introduce system adaptations that do not disrupt the established real-time operation of deployed applications but aim to enhance their resilience against critical runtime events. In this context, the distribution method enables dynamically augmenting already deployed applications with supplementary real-time reaction mechanisms and capabilities to achieve this.

According to various embodiments, to distinctly segregate processes and interactions involved in the operation of real-time applications from those that are not, two operational planes in the processing system are considered: the control plane and the data plane. Each process/interaction is associated with one of these planes based on the real-time requirements it is subject to. Those associated with the control plane are not bound to real-time constraints. The orchestrator and its associated services, e.g., monitoring services reporting to the orchestrator, are part of the control plane. Conversely, data plane encompasses real-time processes/interactions. In the distribution method according to various embodiments, processes/interactions within each real-time application as well as all supplementary services and mechanisms associated with them pertaining to real-time reaction capabilities are part of the data plane.

As illustrated in FIG. 1, a distributed processing system is in the following considered which consists of a set of possibly heterogeneous compute nodes (processing nodes) interconnected via a communication network (possibly formed of multiple sub-networks). The processing system includes a component responsible for managing applications and resources in the system, referred to as the orchestrator (implemented by the orchestration device 106 which implements a distribution tool 107 in the example of FIG. 1). In general, the orchestrator's management scope is not necessarily encompassing of deploying all applications in the system. Subject to the use case, it is possible that the orchestrator oversees only a subset of the applications. Nonetheless, while it does not necessarily manage all applications, the orchestrator can configure system resources to control the interference among existing (possibly externally managed) and incoming applications. Moreover, the orchestrator's management scope can cover a broad range including adapting the deployment or configuration of existing applications based on system dynamics, serving incoming requests to deploy new applications, serving requests to adapt existing applications (e.g., to establish fault-tolerance for an already deployed application), etc.

The applications to be hosted in the processing system (i.e. whose data processing tasks are to be performed by the processing system) are represented as a set of communicating software components referred to as (software) modules (e.g. corresponding to sub-tasks 109). Incoming requests (e.g. at the orchestrator 107) to deploy an application or adapting an existing one also provide a description of the application's non-functional requirements with respect to real-time constraints, fault-tolerance, etc. This information is provided to the orchestrator 107 and is used for making dynamic deployment and system management decisions. The decisions of the orchestrator may entail deploying, configuring, and terminating modules across the compute nodes and/or configuring the resources in the system.

Figure 2:
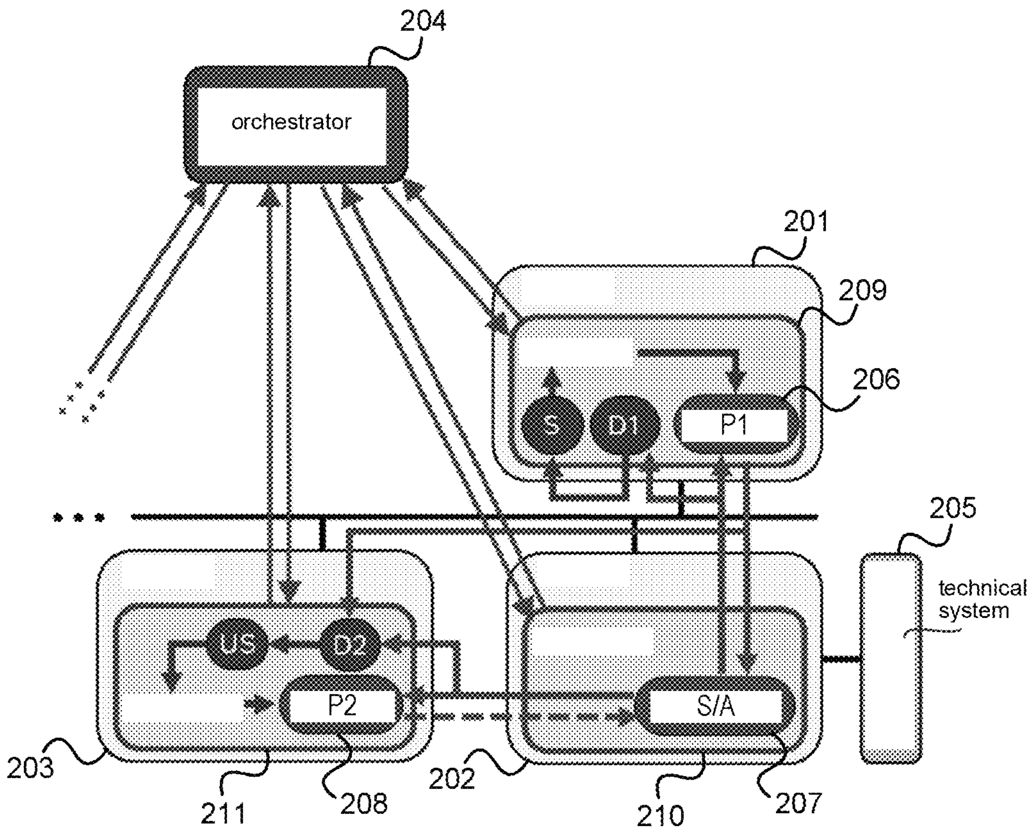
FIG. 2 shows an example of a processing system including three processing nodes and being deployed by an orchestrator, according to an example embodiment of the present invention.

FIG. 2 shows an example of a processing system including three processing nodes 201-203 and being deployed by an orchestrator 204. The orchestrator 204 may send commands to the processing nodes 201-203 and may receive acknowledgements and state information from the processing nodes 201-203. In this example the data processing task is the control of a technical system 205 (e.g. a plant). The connection to the technical system 205 is via the second processing node 202, which for example corresponds to the controller 101. The orchestrator 204 for example corresponds (or is implemented by) the computer 106. Each processing node 201-203 performs a respective sub-task 206-208.

According to one embodiment, the execution of the orchestrator's decisions on the processing nodes 201-203 (e.g., to deploy or terminate modules on the processing nodes or change the configuration of resources and modules) is facilitated by a software service resident on each processing node with adequate system privileges to enact the orchestrator's commands. Various implementation possibilities exist for this service, e.g., a server implemented as kernel module or/and a service process with system privileges or/and a runtime-based execution environment that controls the modules. Herein, this service is referred to as runtime 209-211 implemented on each processing node 201-203. Besides enacting the orchestrator's commands to launch, configure, and terminate modules on its node or configure its node's resources, a runtime can also provide feedback to the orchestrator about the state of its hosted modules, the state of the node's resources, or details regarding the occurrence of certain events.

The distribution method enables provisioning distributed applications with real-time reaction mechanisms. The following steps outline a general approach for carrying out this distribution method in conjunction with (i.e. e.g. performed by) an orchestrator (e.g. orchestrator 204), describing the essential analyses and procedures involved. Other realizations are, however, also possible.

i. Requirement analysis: the application and system resources are analyzed to identify the critical scenarios—such as resource failures—that demand real-time reaction according to the application's requirements. Such analysis might involve specialized tools and/or expertise with respect to reliability, fault-tolerance, safety, resources/technologies of the system, etc. Moreover, it can introduce additional deployment requirements, like redundant module (or sub-task) deployment or module-node affinity relations.

ii. Deployment selection: A preliminary deployment of the application's modules (i.e. sub-tasks) on the processing system resources is determined based on its deployment requirements and availability of resources. This can be achieved using mapping and optimization services of the orchestrator.

iii. Determining required failure handling capabilities. Building on the preliminary deployment and identified critical scenarios (i.e. failure types), the set of failure handling capabilities needed for the deployment to effectively react to these scenarios (failure types) is determined. These failure handling capabilities typically involve detection of the failure scenarios and proper reaction to them, e.g., changing deployment configurations or switching the operational mode of the application.

iv. Determining required failure handling services and mechanisms. The specific failure handling mechanisms and services to realize the determined required capabilities are determined. Several options might be possible for realizing a capability, e.g., additional software components (to be linked with the application's modules) or additional modules (to be deployed alongside the application modules).

v. Synthesis: The determined failure handling services and mechanisms are synthesized, e.g., by linking them to application modules, synthesizing them as separate modules, etc., to equip the preliminary deployment with the determined additional failure handling capabilities.

vi. Evaluation: The resulting deployment is evaluated with respect to its adherence to the real-time constraints of the application. If necessary, a suitable configuration for the resources involved in the execution of the application (i.e. the processing nodes and their components as well as possibly a communication network connecting the processing nodes) is determined. If the deployment fails the evaluation, an alternative deployment is selected (return to step ii).

vii. Deployment execution: Upon successfully passing the preceding evaluation, the deployment is executed by distributing respective modules to corresponding system resources and applying the respective resource/module configurations.

In the general approach outlined above, the steps (i), (iii), (iv), and (v) can be seen as the core components of the distribution method. These steps cover the aspects of identifying the required failure handling capabilities in steps (i) and (iii) and integrating the corresponding failure handling mechanisms to a given deployment of the application in steps (iv) and (v). Meanwhile, for the remaining steps, established approaches and methodologies can be used. For example, for step (ii), specialized techniques such as constraint-based mapping and design space exploration (DSE) can be used to determine a deployment of the application. For step (vi), techniques such as real-time admission tests or timing analyses can be used to evaluate the adherence of a given deployment (inclusive of the provisioned mechanisms) to the real-time requirements of the application.

In the following, an example of the distribution method according to i to vii as described above is given with respect to the example illustrated in FIG. 2 wherein the (single) failure type that the processing system should be capable of handling is in this example the disconnection of a node (the first processing node 201 is used as example). So, in the following example, the distribution method provides real-time failover support for a real-time control application to establish robustness for it against node disconnection in a distributed system.

As mentioned above, the application (i.e. the overall data processing task) is a control application responsible for plant control, consisting of two modules: "Sense and Act" and a "Process" module. The Sense/Act (S/A) module periodically collects sensor data from the plant 205 and sends these to the Process module. Based on this data, the Process module computes the proper control data to be applied to the plant 205 and sends it to the Sense/Act module, which applies the control signals to the plant 205.

The processing system is to consist of a set of interconnected processing (or compute) nodes, each hosting an instance of the runtime (or "runtime service") that serves as the orchestrator's agent. In the present example, the second processing node 202 is directly connected to the plant 205, is equipped with sensing/actuation mechanisms for plant interaction, has low compute capabilities (intended only for plant interactions with minimal computation demand), and is hardened against failure and disconnection.

It is assumed that deployment requirements include that the application must adhere to a given end-to-end latency constraint (from sensor reading to the actuation of the control signal). Further, it is assumed that the Sense/Act module must be deployed exclusively on the second processing node 202 due to its direct interaction with the plant and that the Process module must be deployed on a processing node with high compute power, i.e., other than the second processing node 202. Further, as mentioned above, as required failure type that the processing system should be able to handle the application (data processing task) in a manner that the potential disconnection of one processing node can be tolerated.

The steps i to vii are in this example as follows:

i. Requirement analysis: the fault-tolerance requirement of the application entails that it must be robust against the potential disconnection of a node. For that, it is decided to be deployed with real-time failover support for its modules, requiring redundant instances (replicas) of each module to be deployed on different nodes. Since the Sense/Act module must be deployed on processing node 202 which is hardened against failures, it is excluded from redundant deployment. Thus, redundancy is planned only for the Process module. To have the required failure handling capability, two instances of the Process module are deployed: one as failover primary and the other as its hot-standby backup.

ii. Deployment selection: according to the results of the requirement analysis, a total of three modules (subtasks) are considered to be deployed: one instance of the Sense/Act module on the second processing node 202, and two instances of the Process module on two nodes other than the second processing node. Specifically, the mapping procedure decides to deploy the primary Process module (P1, sub-task 206) on the first processing node 201 and the backup instance (P2, sub-task 208) on the third processing node 203. It should be noted that these two sub-tasks 206, 208 correspond to (i.e. are replicas of) the same sub-task 109 of the respective data processing task 110 but only one is active: both receive data from the Sense/Act module 207 and compute the control signal. Initially, the primary sub-task 206 is configured to be active so that its output data is sent to the Sense/Act module 207, and the backup sub-task 208 is configured to be inactive so that its output is discarded so that only one control signal is sent to Sense/Act module 207 for each sensor reading.

iii. Determining required capabilities: Given the deployment from the previous step, the application is required to sustain the disconnection of the first processing node 201 hosting the primary Process module 206. This requires the capability to detect the failure of the first processing node 201. Upon that event, the primary Process module 206 must be deactivated (an action that is referred to as "silencing" in the following) and the backup Process module 208 must be activated (an action that is referred to as "un-silencing" in the following). Therefore, corresponding capabilities are needed:

a. on the first processing node 201 to detect its disconnection and subsequently silence the local primary Process module 206 and b. on the third processing node 203 to detect the disconnection of the first processing node 201 and subsequently 21eparate21d the backup Process module 208.

iv. Determining required mechanisms: for the capability to detect the first processing node's disconnection, a mechanism based on watchdogs is used which is realized by special modules. Also, for the enaction of the failover, two special modules are planned, one to silence the primary Process module 206 on the first processing node 201 and the other to un-silence the backup Process module 208 on the third processing node 203. For clarity, these special modules are referred to as "sidecars":

a. Detector sidecar D1: this sidecar is a watchdog responsible for detecting the disconnection of the first processing node 201. It consumes the sensor data from the Sense/Act module 207. In the absence of new sensor data for a predefined interval, it concludes the disconnection of the first processing node 201 and issues a control command denoting that the first processing node 201 is disconnected.

b. Silencer sidecar S: this sidecar listens for the command from D1, and upon receiving it, silences the primary Process module 206 by requesting the first processing node's runtime 209 to deactivate the primary Process module's output. This ensures that, in the case of a reconnect of the first processing node 201, the primary Process module 206 does not produce unwanted data.

c. Detector sidecar D2: this sidecar is a watchdog responsible for detecting the disconnection of the first processing node 201. It consumes the control data from the primary Process module 206 and the sensor data from the Sense/Act module 202. It concludes the disconnection of the first processing node 201 in the case of not receiving any control data for a predefined interval, while still receiving the sensor data. Upon detecting the disconnection of the first processing node 201, it issues a control command reflecting that the first processing node 201 is disconnected.

d. Un-silencer sidecar US: this sidecar listens for the commands from D2, and upon receiving it, un-silences the backup Process module 208 by requesting the third processing node's runtime 211 to activate the outputs of the backup Process module 208.

v. Synthesis, evaluation, and deployment: the sidecars are added as failure handling modules (realizing real-time detection of the first processing node's disconnection and failover mechanism for the Process module) to the set of application's modules, resulting in a total of seven modules (three modules for sub-tasks of the data processing task, four failure handling modules) to be deployed. Subsequently, the deployment is evaluated and verified to meet the application's real-time requirements.

Although the orchestrator 204 is not involved in the execution of the application or the real-time failover of the Process module in the event of disconnection of the first processing node 201, it can still make advantageous adaptations to the application without jeopardizing its real-time guarantees. For instance, the orchestrator 204 can provision a new backup and the necessary sidecars for the Process module after one of the processing nodes 201, 203 hosting either of its replicas 206, 208 is disconnected. This fortifies the application against a potential subsequent node failure, thereby boosting its availability. This provisioning is done by the orchestrator 204 and happens orthogonally (i.e. in a transparent manner) to the application's real-time execution. Therefore, it does not affect the application's operational correctness or real-time guarantees.

Figure 3:
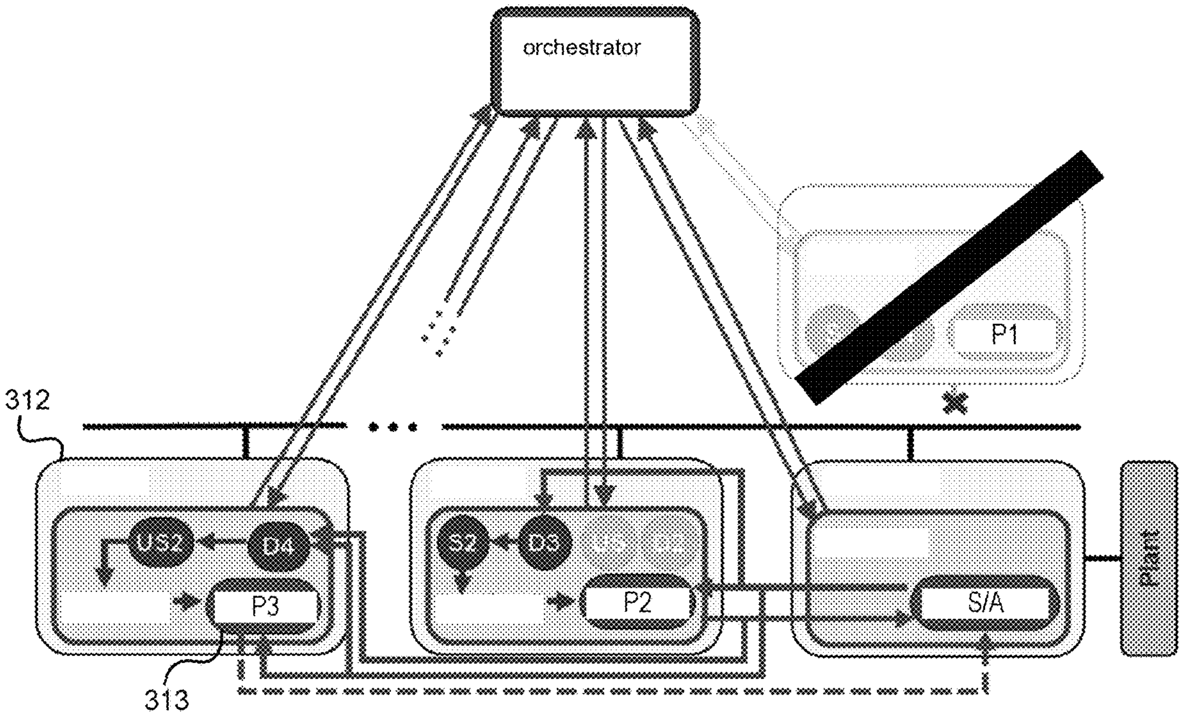
FIG. 3 illustrates an adaptation of the deployment of FIG. 2.

FIG. 3 illustrates such a deployment adaptation in reaction to a disconnection of the first processing node 201, encompassing a new backup instance 313 of the Process module (P3) on a fourth processing node 312 and corresponding sidecars. The necessary disconnect-detection and failover-enaction mechanisms are realized by the newly deployed sidecars D3, D4, S2, and US2. Here, D3 and D4 realize the mechanism for detecting disconnection of the third processing node 203—analogously to the operations of D1 and D2 in the initial deployment detailed above (illustrated in FIG. 2). Sidecars S2 and US2 also operate analogously to S and US sidecars in the initial deployment: S2 listens for the output of D3, and upon receiving it, silences its local Process instance (P2 which is the current primary Process module after the disconnection of the first processing node 201). US2 listens for the output of D4, and upon receiving it, un-silences P3 (which is the new backup Process module). Thereby, upon disconnection of the third processing node, a real-time failover from P2 to P3 is enacted.

Besides the deployment schemes described in the example above, other schemes are also possible to realize real-time detection and reaction mechanisms for fault tolerance:

For disconnect detection: instead of having the detector sidecars monitor application messages, an alternative approach is to deploy a dedicated heartbeat sidecar on each processing node to send periodic heartbeat messages into the system. The detector sidecars then listen to the heartbeat messages emitted by the heartbeat sidecars. An advantage of this approach over listening to application messages is that this approach enables configuring the speed of disconnection detection by (dynamically) adjusting the heartbeat period of the heartbeat sidecars and the watchdog timeout of the detector sidecars.

For silencing the primary replica upon a disconnection of the node hosting it: instead of having the silencer sidecar send a request to its runtime to change the output configuration of its local (thus-far-primary) replica, an alternative approach is to have the silencer act as a relay for the output messages of its local replica. That is, pre-configuring the dataflow of the application such that the outputs of the replica pass through the silencer. With this scheme, the silencer can act as a switch to relay or block the replica's outputs from entering the network. If a disconnection occurs, the silencer can discard the messages from the replica and, thereby, prevent these from entering the network without needing the involvement of the runtime or reconfiguration of the primary. A similar scheme can be used for the un-silencer sidecar and the backup replica.

Informing the orchestrator about node disconnections: instead of having the runtimes provide feedback to the orchestrator with respect to the detection of node disconnection, an alternative approach is to deploy notifier sidecars on the different nodes, listening for the disconnection messages produced by the local detector sidecar and relay this information to the orchestrator. In general, sidecars offer the opportunity for dynamic deployment of monitors and notifiers within the system; In response to system dynamics, the orchestrator (or one of the sidecars) can deploy sidecars specialized in monitoring specific events, modules, interactions, or resources within the system. These sidecars can then notify the orchestrator (or other entities interested in the monitored events) when the observed events occur or provide regular state updates to the orchestrator regarding the specific aspects of the state of the subjects they monitor. This feedback can be provided proactively and/or reactively in response to a query from the orchestrator.

It should be noted that protection against other failure types than processing node disconnection may be provided analogously, for example halt failures (i.e. a processing node (or a processing (sub-)task) stops to carry out its function (at least partially), e.g. stops generating (e.g. control) data), processing errors (output is not correct or has wrong timing), environment failures such as overflow of a buffer (not specific to a processing node or process) or failure of the controlled technical system.

A further example is a network partition/segmentation fault, e.g., the failure of a link or switch in the network, results in the network being partitioned into disconnected sub-networks (or partitions) that were previously connected via the links/switches that failed. As a result of the partition fault, communication between different network partitions becomes impossible while pre-existing communication options within each partition remain intact.

The case with node disconnection faults can be seen to be a special case of this category of faults. There the network is partitioned into a sub-network containing only the disconnected node and a second sub-network containing the rest of the network.

To achieve resilience against network partition faults, backup instances of sub-tasks can be strategically deployed on different nodes across the network, together with additional sidecars to detect the occurrence of a network partition fault and activate the proper backup instance(s) in case the primary instance is no longer reachable due to the partitioning of the network.

It should be noted that this scheme for achieving resilience is only applicable thanks to the distribution of the sidecars enacting the failover, so that in the case of a partition fault, the sidecars in each partition still have the necessary connectivity within that partition to detect the fault and react to it (e.g., by activating a local backup replica). On the other hand, a centralized orchestrator, regardless of its computational capabilities, is incapable of enacting any actions on nodes situated in parts of the network that are no longer reachable by the orchestrator (due to the partition fault).

As mentioned in the example of FIG. 3, the orchestration device may dynamically adjust the failure handling mechanisms or other aspects of the configuration of the processing system, e.g. in reaction to a failure (as above) but also a change of system parameters or requirements. Adjustments may for example include killing a process (sub-task), deploying an additional sub-task or sub-task instance, instructing a processing node to unblock its output or starting a sub-task. Processing nodes may inform the orchestration device about detected failures or changes in the environment.

In summary, according to various embodiments, an orchestration device for a distributed processing system is provided, e.g. corresponding to the computer 106 of FIG. 1.

The orchestration device comprises an input interface configured to receive a specification of a data processing task to be performed by the distributed processing system and of one or more (distributed processing) failure types that the data processing system should be able to handle (i.e. of a fault-tolerance requirement) when performing the data processing task (for example, the orchestration device receives a request including this information (specifications) via the input interface).

The orchestration device further comprises a command interface (and e.g. a corresponding controller (or system manager) configured to generate the commands output by the command interface) configured to instruct each of a plurality of processing nodes of the distributed processing system to perform at least one respective sub-task of the data processing task and instruct each of at least some of the plurality of processing nodes to implement one or more failure handling software modules which are configured to handle failures of the specified failure types.

The processing nodes may 27eparatee devices but this is not necessary (i.e. a processing device (e.g. (server) computer) may implement multiple processing nodes).

For example, for handling failures, for at least one of the processing nodes ("Node 1") a detection module is provided in the processing node (Node 1) configured to detect a failure of the processing node (e.g. process silence of Node 1, lack of output (at least temporarily)) and a second detection module is provided in one of the other processing nodes configured to detect a disconnection of the processing node ("Node 1"). In response to the detection of a failure by the first detection module, the output of the processing node (Node 1) is blocked (i.e. the processing node is silenced) and in response to the detection of a failure by the second detection module a replacement processing node (which may be the one include the second detection module) is activated for the disconnected processing node. So, for example, a processing node which has the redundant process instance may be deployed and/or activated to handle the failure of Node 1. Alternatively, a processing node may be activated which implements a safety mechanism.

Figure 4:
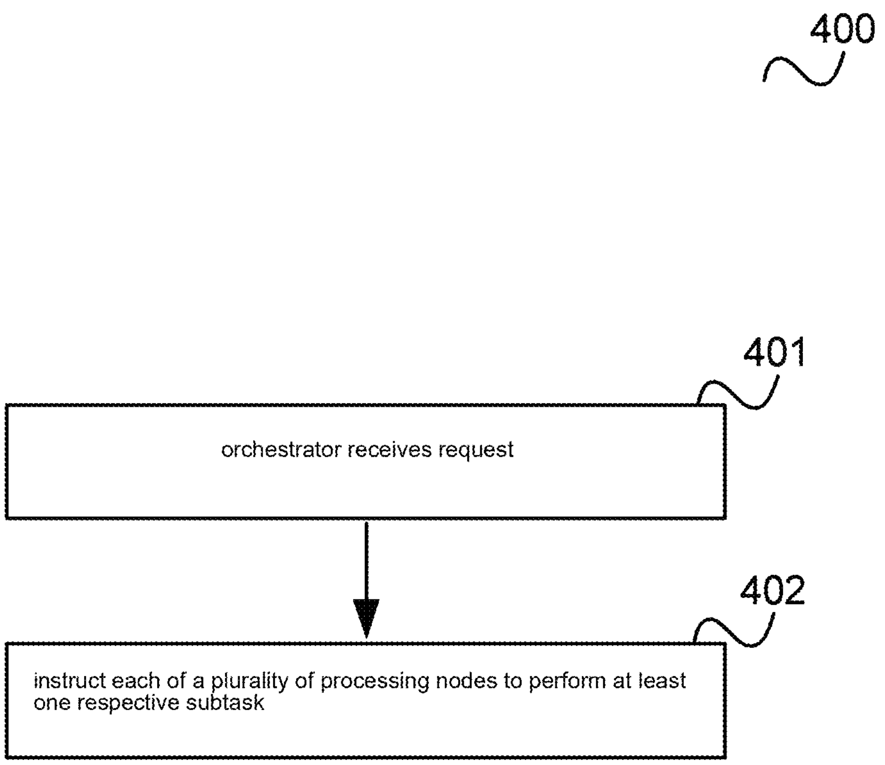
FIG. 4 shows a flow diagram illustrating a method for orchestrating a distributed processing system according to an example embodiment of the present invention.

FIG. 4 shows a flow diagram 400 illustrating a method for orchestrating a distributed processing system.

In 401, a specification of a data processing task to be performed by the distributed processing system and of one or more (distributed processing) failure types that the data processing system should be able to handle (i.e. of a fault-tolerance requirement) when performing the data processing task (for example, the orchestration device receives a request including this information (specifications) via the input interface) is received.

In 402, each of a plurality of processing nodes of the distributed processing system is instructed to perform at least one respective sub-task of the data processing task and instruct each of at least some of the plurality of processing nodes to implement one or more failure handling software modules which are configured to handle failures of the specified failure types.

The orchestration device and the approach of FIG. 4 can be used to execute control software in a distributed manner which computes a control signal for controlling a technical system, like e.g. a computer-controlled machine, like a robot, a vehicle, a domestic appliance, a power tool, a manufacturing machine, a personal assistant or an access control system.

The control software may for example process sensor data from various sensors (cameras) such as video, radar, LiDAR, ultrasonic, thermal imaging, motion, sonar, temperature, pressure etc.

The orchestration device may be implemented and the method of FIG. 4 may be performed by one or more data processing devices (e.g. computers or microcontrollers) having one or more data processing units (and as described above, for example implementing an automated distribution tool, e.g. distribution tool 107, which performs the method in an automatic fashion, e.g. in response to user input). The term "data processing unit" may be understood to mean any type of entity that enables the processing of data or signals. For example, the data or signals may be handled according to at least one (i.e., one or more than one) specific function performed by the data processing unit. A data processing unit may include or be formed from an analogue circuit, a digital circuit, a logic circuit, a microprocessor, a microcontroller, a central processing unit (CPU), a graphics processing unit (GPU), a digital signal processor (DSP), a field programmable gate array (FPGA), or any combination thereof. Any other means for implementing the respective functions described in more detail herein may also be understood to include a data processing unit or logic circuitry. One or more of the method steps described in more detail herein may be performed (e.g., implemented) by a data processing unit through one or more specific functions performed by the data processing unit.

Accordingly, according to one embodiment, the method is computer-implemented.

What is claimed is:

1. An orchestration device for a distributed processing system, comprising:

at least one processor, including:

an input interface configured to receive a specification of a data processing task to be performed by the distributed processing system and of one or more failure types that the data processing system should be able to handle when performing the data processing task; and a command interface configured to instruct each of a plurality of processing nodes of the distributed processing system to perform at least one respective sub-task of the data processing task, and instruct each of at least some of the plurality of processing nodes to implement one or more failure handling software modules which are configured to handle failures of the specified failure types.

2. The orchestration device of claim 1, wherein the one or more failure handling software modules are configured to handle failures of the specified failure types without necessitating communication with the orchestration device.

3. The orchestration device of claim 1, wherein the input interface is configured to receive a specification of a plurality of software modules, wherein each software module implements a respective one of the sub-tasks and wherein the orchestration device includes a software generator configured to supplement the plurality of software modules by the one or more failure handling software modules.

4. The orchestration device of claim 1, wherein the input interface is configured to receive a specification on how the data processing task may be separated into the sub-tasks and/or a specification of requirements of how the data processing task is to be performed, and the orchestration device is configured to distribute the data processing task to the plurality of processing nodes according to the specification on how the data processing task may be separated into the sub-tasks and/or the requirements.

5. The orchestration device of claim 1, wherein the data processing task is a control task of a technical system.

6. The orchestration device of claim 1, wherein the command interface is configured to instruct, upon a failure which compromises the distributed processing system's capability to handle failures of the specified failure types, one or more of the plurality of processing nodes and/or one or more additional processing nodes the distributed processing system (100) to implement the one or more failure handling software modules and/or one or more additional failure handling modules which are configured to handle failures of the specified failure types.

7. The orchestration device according to claim 1, wherein the at least one processor includes at least one of: an analogue circuit, a digital circuit, a logic circuit, a microprocessor, a microcontroller, a central processing unit (CPU), a graphics processing unit (GPU), a digital signal processor (DSP), or a field programmable gate array (FPGA).

8. A method for orchestrating a distributed processing system, comprising the following steps:

receiving a specification of a data processing task to be performed by the distributed processing system, and of one or more failure types that the data processing system should be able to handle when performing the data processing task; and instructing each of a plurality of processing nodes of the distributed processing system to perform at least one respective sub-task of the data processing task, and instruct each of at least some of the plurality of processing nodes to implement one or more failure handling software modules which are configured to handle failures of the specified failure types.

9. A non-transitory computer-readable medium on which are stored instructions for orchestrating a distributed processing system, the instructions, when executed by a computer, causing the computer to perform the following steps:

receiving a specification of a data processing task to be performed by the distributed processing system, and of one or more failure types that the data processing system should be able to handle when performing the data processing task; and instructing each of a plurality of processing nodes of the distributed processing system to perform at least one respective sub-task of the data processing task, and instruct each of at least some of the plurality of processing nodes to implement one or more failure handling software modules which are configured to handle failures of the specified failure types.

* * * * *